(12) United States Patent  (10) Patent No.: US 9,453,974 B2
Chen                      (45) Date of Patent:    Sep. 27, 2016

(54) ECCENTRIC CUT SLEEVE FOR OPTICAL FIBER ADAPTER (71) Applicant: Verizon Patent and Licensing Inc., Arlington, VA (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 32 days.

(21) Appl. No.: 14/339,626

(22) Filed: Jul. 24, 2014

(65) Prior Publication Data

US 2016/0025941 A1    Jan. 28, 2016

(51) Int. Cl.
*G02B 6/38*    (2006.01)

(52) U.S. Cl.
CPC .......... *G02B 6/3877* (2013.01); *G02B 6/3826* (2013.01)

(58) Field of Classification Search
CPC .................................. G02B 6/38; G02B 6/46
USPC ........................................................ 385/60
See application file for complete search history.

(56) References Cited

U.S. PATENT DOCUMENTS

| 4,179,186 | A  | * | 12/1979 | Tynes ...................... G02B 6/3801 156/158 |
| 4,215,516 | A  | * | 8/1980  | Huschle ................. B24D 11/06 156/304.3 |
| 4,341,631 | A  | * | 7/1982  | Hargitay ............... B01D 63/063 210/321.9 |
| 4,812,009 | A  | * | 3/1989  | Carlisle ................ G02B 6/3821 385/62 |
| 4,818,061 | A  | * | 4/1989  | Iwano ................... G02B 6/3854 385/72 |
| 4,950,048 | A  | * | 8/1990  | Kakii .................... G02B 6/3821 385/83 |
| 5,598,496 | A  | * | 1/1997  | Anderson ............... C03C 17/40 385/84 |
| 5,692,081 | A  | * | 11/1997 | Takahashi ............. G02B 6/2937 385/60 |
| 6,226,432 | B1 | * | 5/2001  | Gonda ................ G02B 23/2476 385/115 |
| 6,551,302 | B1 | * | 4/2003  | Rosinko ............ A61M 25/0136 604/22 |
| 7,027,705 | B2 | * | 4/2006  | Onosato ............... G02B 6/4248 385/135 |
| 7,399,018 | B1 | * | 7/2008  | Khachaturian ........... B66C 1/12 294/74 |
| 2002/0142857 | A1 | * | 10/2002 | Huang .................... A63B 53/14 473/300 |
| 2005/0175289 | A1 | * | 8/2005  | Kitabayashi ......... G02B 6/3838 385/50 |
| 2008/0123695 | A1 | * | 5/2008  | Wako ................ G02B 6/29358 372/6 |
| 2010/0247040 | A1 | * | 9/2010  | Kuriki ................. G02B 6/3821 385/72 |
| 2013/0315542 | A1 | * | 11/2013 | Wyss ..................... G02B 6/381 385/83 |
| 2015/0125929 | A1 | * | 5/2015  | Kozlov .................... C07K 1/22 435/239 |
| 2015/0141854 | A1 | * | 5/2015  | Eberle ................ A61B 5/02154 600/488 |

FOREIGN PATENT DOCUMENTS

JP          2005077766 A    *   3/2005

* cited by examiner

*Primary Examiner* — Kaveh C Kianni (57) ABSTRACT

A cut sleeve for a fiber optic connector adapter includes a cylinder having a discontinuity along an axial length of cylinder. The discontinuity is distributed around at least half of a circumference of the cylinder. The cylinder is sized to receive a first fiber ferrule and a second fiber ferrule with cross-sections having a same size minimum bounding circle.

20 Claims, 11 Drawing Sheets

ECCENTRIC CUT SLEEVE FOR OPTICAL FIBER ADAPTER

BACKGROUND

Fiber optic cables are used for providing telecommunication services to business and residential locations. An Optical Distribution Network (ODN) includes the physical fiber optic cables and devices that distribute communication signals to servers and end users. To connect fiber optic cables, each cable can be terminated with a fiber connector and two fiber connectors can be coupled using an adaptor. When fiber connectors are mated with one another, the optic fibers in each cable should be aligned with one another to facilitate optical transmission between the optic fibers. To minimize losses associated with the mated fiber connectors, it is important that the fiber connectors provide accurate fiber alignment (i.e., core-to-core alignment of the fiber media) such that optimum physical contact can be maintained between each mated fiber pair.

DETAILED DESCRIPTION OF PREFERRED EMBODIMENTS

The following detailed description refers to the accompanying drawings. The same reference numbers in different drawings may identify the same or similar elements.

Devices and methods described herein provide a specialized cut ferrule sleeve (or simply "cut sleeve") inside an adaptor for fiber cable connectors. The cut sleeve provides improved concentricity for mated ferrules inserted within the cut sleeve and allows for mating of differently-shaped ferrules, including those with non-circular cross-sections. In contrast with a conventional cut sleeve that includes a straight line cut along an axial length of the sleeve, implementations herein provide a cut sleeve with an end-to-end cut that is distributed around the circumference of the sleeve (referred to herein as an "eccentric cut sleeve" or, alternatively, a "curved cut sleeve"). The eccentric cut sleeve may permit use of ferrules with, for example, non-circular cross-sections, so that optical fibers in the ferrule can be precisely centered, after polishing of the ferrule/fiber end face, to provide low insertion losses of mated ferrules.

According to one implementation a cut sleeve for a fiber optic connector adaptor includes a cylinder having a discontinuity along an axial length of the cylinder. The discontinuity is distributed around at least half of a circumference of the cylinder. The cylinder is sized to receive a first fiber ferrule and a second fiber ferrule with cross-sections having a same size minimum bounding circle. The minimum bounding circle may be the smallest circle size that completely contains the cross-sectional shape of a fiber ferrule.

Figure 1:
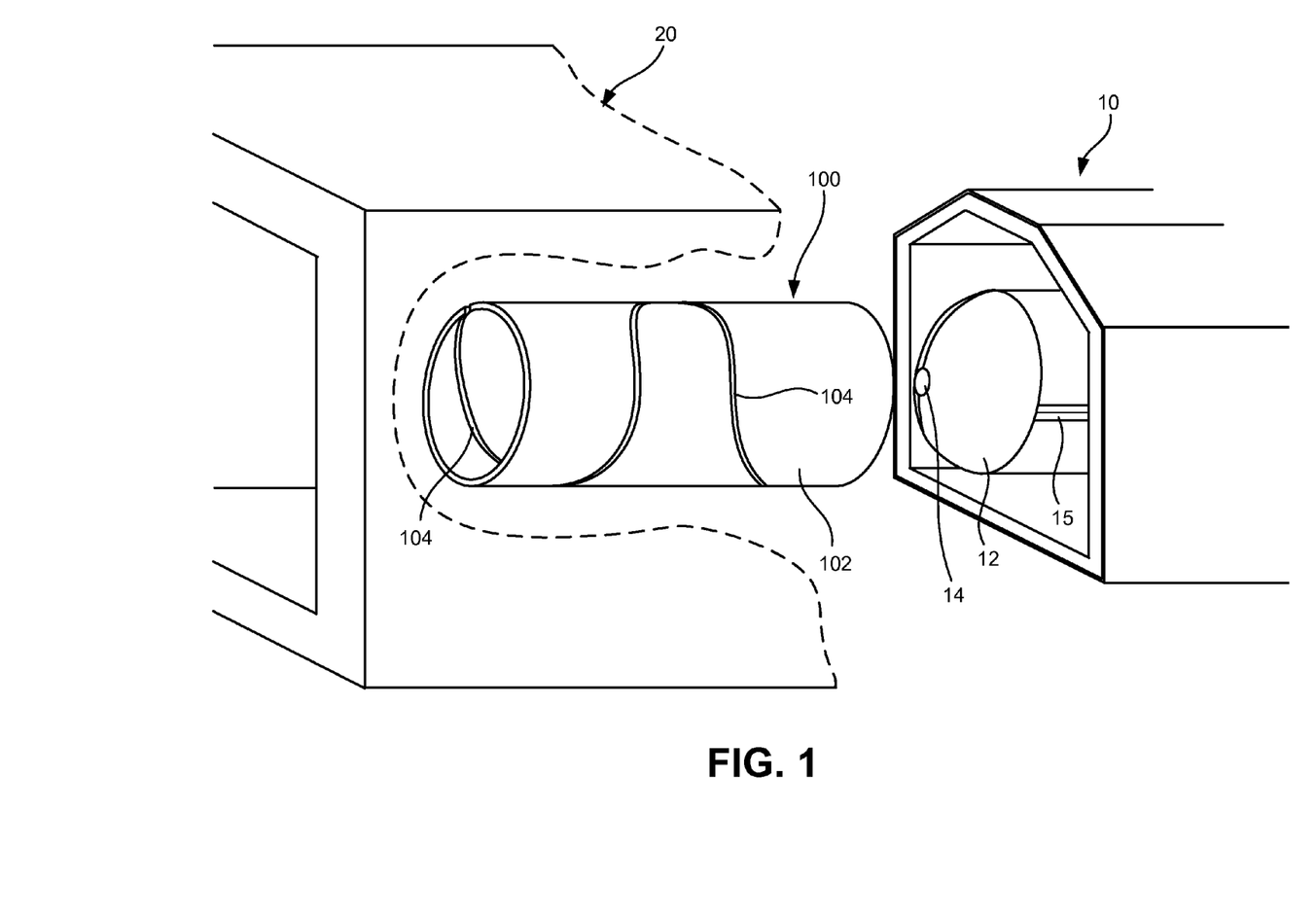
FIG. 1 is a simplified schematic illustrating concepts described herein.

FIG. 1 is a simplified schematic illustrating concepts described herein. A fiber optic connector 10 includes a fiber ferrule 12. Fiber ferrule 12 may include a high-precision hole in the center of fiber ferrule 12 to hold a stripped, bare optical fiber 14 (e.g., a single mode or multimode optical fiber with a combination of core and cladding). Optical fiber 14 may be secured in ferrule 12 via a bonding agent, such as epoxy or adhesive. An end of optical fiber 14 is typically polished and exposed at the end of ferrule 12. The shape of the polished end of optical fiber 14 may vary depending on the type of polish style used. Typical polished styles include Physical Contact (PC), Ultra Physical Contact (UPC), and Angled Physical Contact (APC), among others. Connector 10 may be inserted, for example, into an adaptor 20 to match the end of optical fiber 14 with another optical fiber (not shown in FIG. 1). In some implementations, adaptor 20 may be mounted within a port and include, for example, a structure with clips, springs, threads, or the like, to join two connectors 10.

To facilitate proper alignment of optical fiber 14, adaptor 20 includes an eccentric cut sleeve 100 to axially center fiber ferrule 12 and another fiber ferrule (not shown in FIG. 1) within eccentric cut sleeve 100. Eccentric cut sleeve 100 may generally include a cylinder 102 with a split 104 (also referred to as a cut or discontinuity) along an axial length (e.g., from one opening to the opposite opening) of cylinder 102. In one implementation, eccentric cut sleeve 100 may be secured within adaptor 20 in a manner to permit rotation of eccentric cut sleeve 100 (e.g., about the axis of cylinder 102). As shown in FIG. 1, split 104 may be distributed around all or at least a substantial portion (e.g., more than 50 percent) of the circumference of cylinder 102. The distribution of split 104 prevents imperfections 15 along the length of fiber ferrule 12 from aligning with split 104, regardless of the rotation orientation of eccentric cut sleeve 100.

Cylinder 102 generally has an inside diameter equal to or slightly smaller than the diameter of fiber ferrule 12, such that insertion of fiber ferrule 12 causes a slight expansion of cylinder 102 and causes cylinder 102 to exert a consistent force on fiber ferrule 12 (and the other mated fiber ferrule) to maintain alignment of the optical fibers 14. In an exemplary configuration, cylinder 102 may be sized to receive standard diameter fiber ferrules 12, such as ferrules with a 1.25 mm outside diameter or a 2.5 mm outside diameter.

Although FIG. 1 provides a simplified view of one mechanical connector/adapter configuration, implementations described herein may apply generally to any type of fiber optic adapter that can include a cut sleeve. For example, implementations described herein may be used in SC, LC, MU, and/or FC-type adaptors.

Figure 2A:
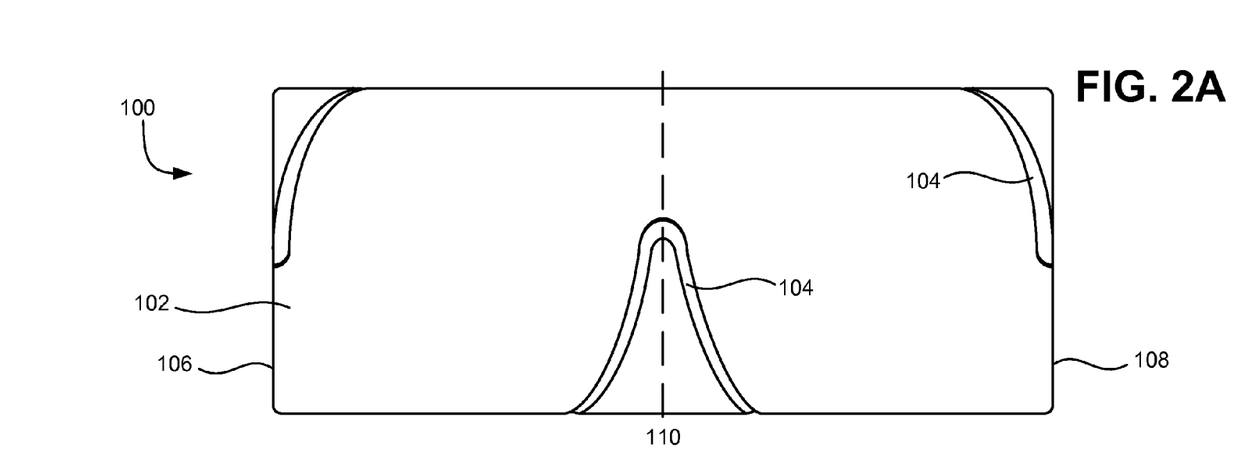
FIGS. 2A and 2B are schematic opposite side views of the exemplary cut sleeve of FIG. 1.
Figure 2B:
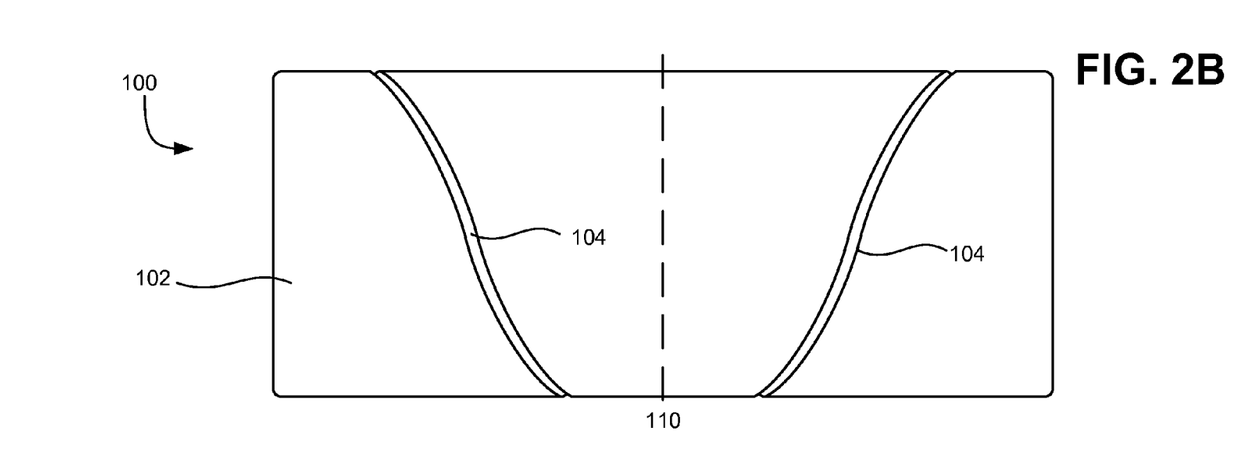

FIGS. 2A and 2B are opposite side views, respectively, of eccentric cut sleeve 100. More particularly, FIGS. 2A and 2B shows eccentric cut sleeve 100 in two different positions, rotated 180 degrees around a central axis of cut sleeve 100. Referring collectively to FIGS. 2A and 2B, in one implementation, split 104 may be symmetrically arranged on either side of a center line 110 of cylinder 102. Center line 110 represents a central circumference line between ends 106 and 108 of cylinder 102. On each side of the center line 110, split 104 may span the distance from center line 110 to a respective end 106/108. In the configuration shown in FIGS. 2A and 2B, split 104 may form a single revolution around the circumference of cylinder 102 (e.g., a clockwise spiral) between center line 110 and end 106. Conversely, split 104 may form a single revolution in the opposite direction around the circumference of cylinder 102 (e.g., a counter-clockwise spiral) between center line 110 and end 108. In another implementation, split 104 may span at least half of the circumference of cylinder 102 on either side of center line 110. Generally, eccentric cut sleeve 100 may be configured such that the distribution of split 104 on cylinder 102 is the same on either side of center line 110.

Figure 3:
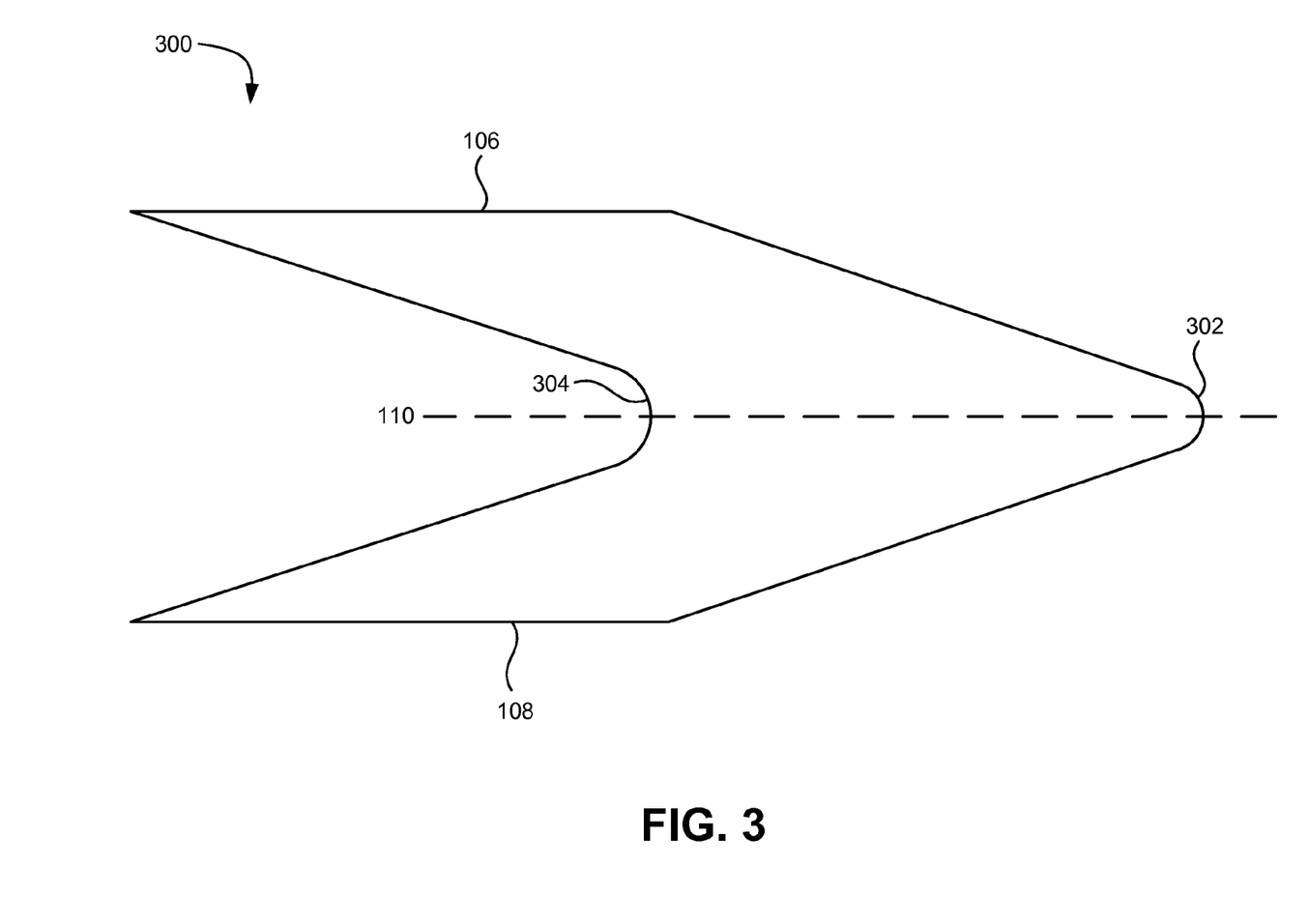
FIG. 3 is a schematic view of an unrolled sheet for forming the cut sleeve of FIG. 1, according to an implementation described herein.

FIG. 3 is a schematic view of an unrolled sheet 300 for forming eccentric cut sleeve 100 according to an implementation described herein. Sheet 300 may include, for example, a metal or alloy such as titanium, stainless steel, nickel, zirconium, or aluminum alloys. Generally, the material for sheet 300 may be hard, corrosion-resistant, dust-free, and able to be formed (e.g., into the shape of eccentric cut sleeve 100) with relatively fine tolerances. According to one implementation, sheet 300 may be stamped from a thin titanium (or another metal/alloy) plate, providing for a simple, cost-effective production method. Sheet 300 may have a thickness consistent with a desired wall-thickness for eccentric cut sleeve 100 to apply radial forces on ferrule 12. In one implementation, sheet 300 may have thickness of less than one millimeter. Sheet 300 may be sized for particular applications/size of eccentric cut sleeve 100. Particularly, ends 106/108 may be about the length of a desired circumference for eccentric cut sleeve 100. A leading edge 302 of sheet 300 may be rolled (e.g., around a dowel) up to a trailing edge 304 of sheet 300 to form eccentric cut sleeve 100 with split 104 being created at the interface of leading edge 302 and trailing edge 304.

In other implementations, eccentric cut sleeve 100 may be manufactured using other techniques and/or materials. For example, in another implementation, eccentric cut sleeve 100 may be formed (e.g., molded, rolled, etc.) as a hollow cylinder with split 104 formed after the cylinder is formed. For example, in this implementation, eccentric cut sleeve 100 may be formed from a ceramic material (such as zirconia), a metal, or an alloy. Split 104 may be formed on cylinder 102 using laser welding or another precision cutting process. In still another implementation, eccentric cut sleeve 100 may be formed using a mold with breaks for split 104 integrated into the mold.

Although FIG. 3 shows an exemplary configuration for unrolled sheet 300 used to form eccentric cut sleeve 100, in other implementations unrolled sheet 300 may include different configurations. For example, leading edge 302 and trailing edge 304 may include multiple concave or convex curves. In another example, leading edge 302 and trailing edge 304 may be elongated to form a split 104 (when rolled into cylinder 102) of more than one circumference on either side of centerline 110. In still another example, leading edge 302 and trailing edge 304 may form a split 104 that is less than one circumference (as low as one-half circumference) on either side of centerline 110.

Figure 4A:
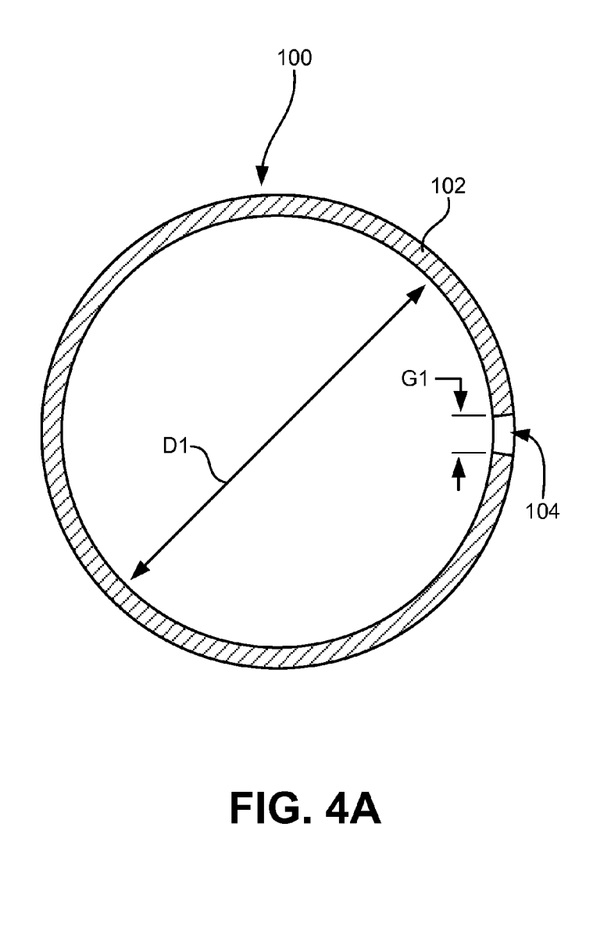
FIG. 4A is a schematic, cross-sectional end view of the cut sleeve of FIG. 1.
Figure 4B:
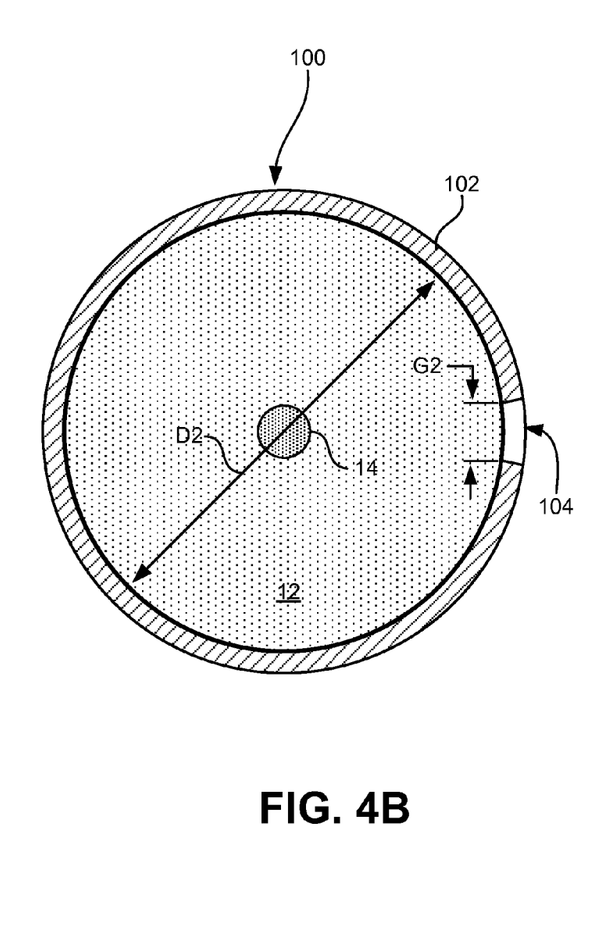
FIG. 4B is a schematic, cross-sectional end view of the cut sleeve of FIG. 1 with an optical fiber ferrule inserted.

FIG. 4A is a schematic, cross-sectional end view of eccentric cut sleeve 100, and FIG. 4B is a schematic, cross-sectional end view of the eccentric cut sleeve 100 with optical fiber ferrule 12 inserted. As shown in FIG. 4A, cylinder 102 may have an initial diameter D1, and a small gap size G1, along the length of split 104 when no ferrules are inserted into eccentric cut sleeve 100. Diameter D1 may be smaller than or equal to the diameter of ferrule 12, such that insertion of ferrule 12 may cause diameter D1 and/or gap size G1 to change to allow eccentric cut sleeve 100 to accommodate ferrule 12.

As shown in FIG. 4B, insertion of ferrule 12 may cause the diameter of cylinder 102 to increase to D2 and the gap size along split 104 to expand to G2. Compression forces from the expanded cylinder 102 help to center ferrules 12 in eccentric cut sleeve 100 and align optical fibers 14 with each other.

Figure 5:
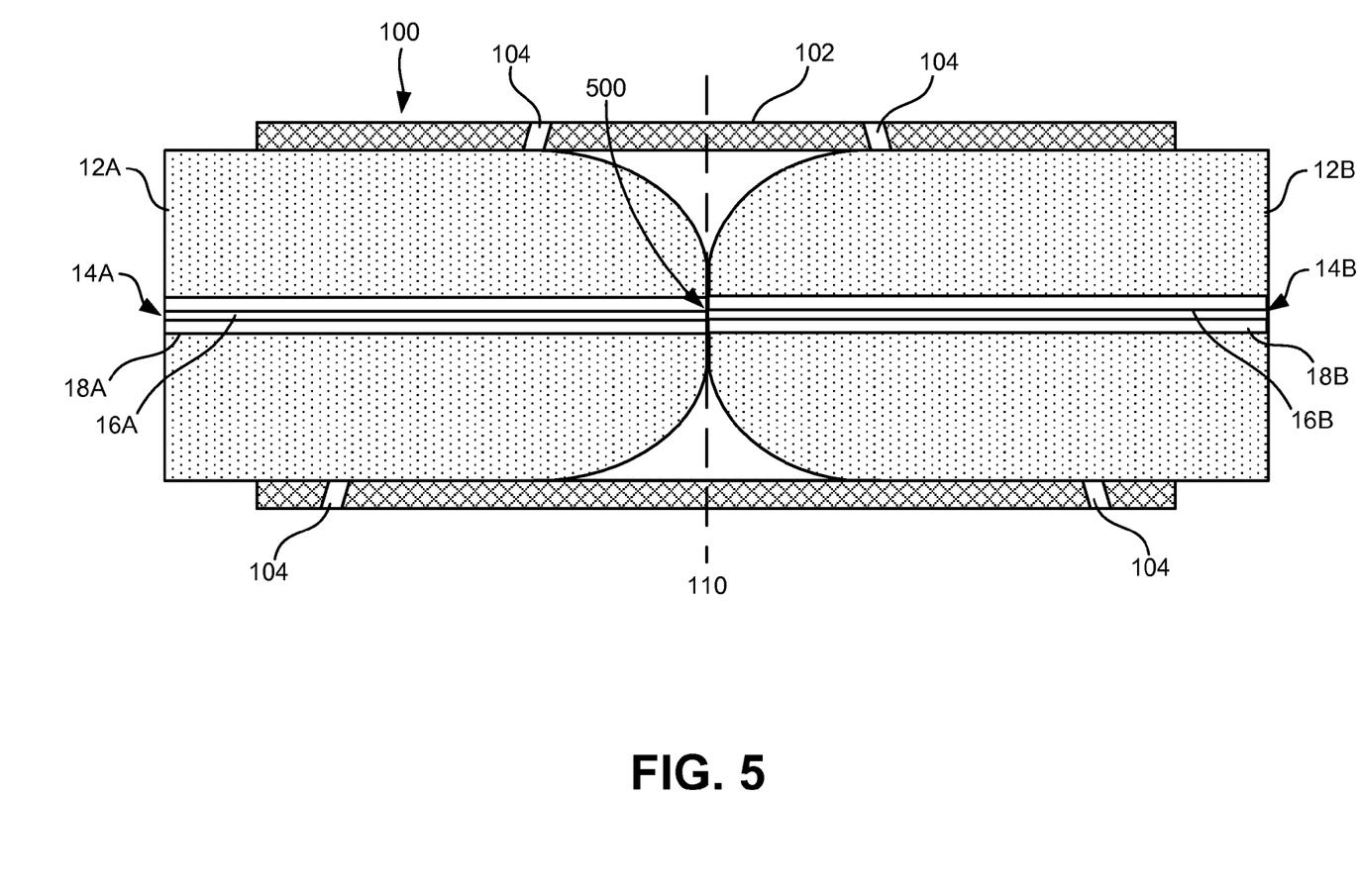
FIG. 5 is a schematic, cross-sectional diagram of two optical fiber ferrules joined within the cut sleeve of FIG. 1.

FIG. 5 is a schematic, cross-sectional diagram of two optical fiber ferrules 12A and 12B joined within eccentric cut sleeve 100, according to an implementation described herein. As shown in FIG. 5, ferrule 12A may be mated to ferrule 12B to provide an optical connection between optical fibers 14A and 14B. Optical fibers 14A and 14B are shown with cores 16A/16B and cladding 18A/18B respectively. In the configuration of FIG. 5, cylinder 102 may include split 104 distributed symmetrically around the circumference of cylinder 102 with respect to center line 110.

Generally, eccentric cut sleeve 100 (along with other components of connector 10 and adapter 20) may provide and maintain proper geometry of the connection to provide optimal signal transfer at an interface 500 between optical fiber cores 16A and 16B. For example, the distribution of split 104 around the circumference of cylinder 102 provides a uniform distribution of compression forces to each fiber ferrule 12 and prevents imperfections 15 along the length of fiber ferrule 12 from aligning with split 104, regardless of the rotation orientation of eccentric cut sleeve 100.

Figure 6:
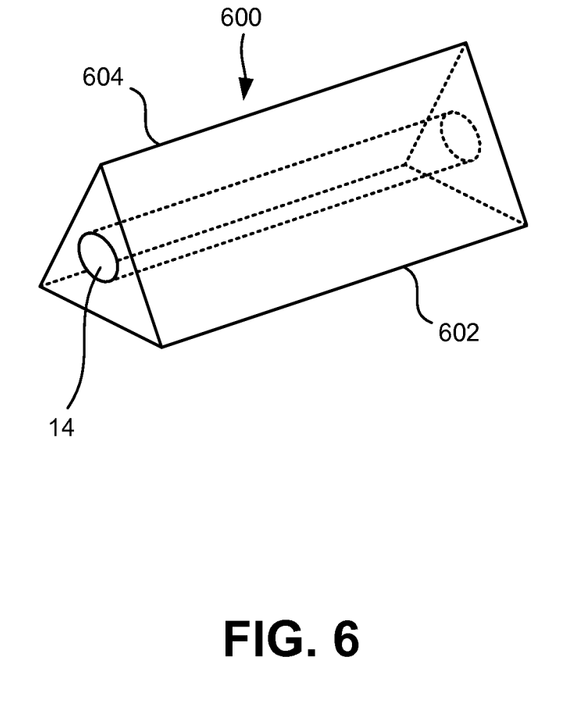
FIG. 6 is a schematic, isometric view of non-cylindrical optical fiber ferrules shapes that may be used with the cut sleeve of FIG. 1, according to an implementation described herein.

The configuration of eccentric cut sleeve 100 may permit use of fiber ferrules with non-circular cross-sections. Particularly, ferrule shapes may be selected that provide easier, more cost-effective, or more precise manufacturing. FIG. 6 is a schematic isometric view of a non-cylindrical optical fiber ferrule shape that may be used with eccentric cut sleeve 100, according to an implementation described herein. More particularly, FIG. 6 shows a fiber ferrule 600 with a triangular cross-section such that three edges 602, 604, and 606 (labelled in FIG. 7) extend along the length of fiber ferrule 600. Fiber ferrule 600 may include an equilateral triangle cross-section with optical fiber 14 centered within fiber ferrule 600. Fiber ferrule 600 may be made from conventional materials, such as thermoplastic, glass, or ceramic. Optical fiber 14 may be secured within fiber ferrule 600 via a bonding agent, such as epoxy or adhesive. As with circular ferrules, an end of optical fiber 14 may be polished and exposed at the end of fiber ferrule 600. The shape of the polished end of optical fiber core 14 may be selected from a known polish style (e.g., PC, UPC, APC, etc.).

Figure 7:
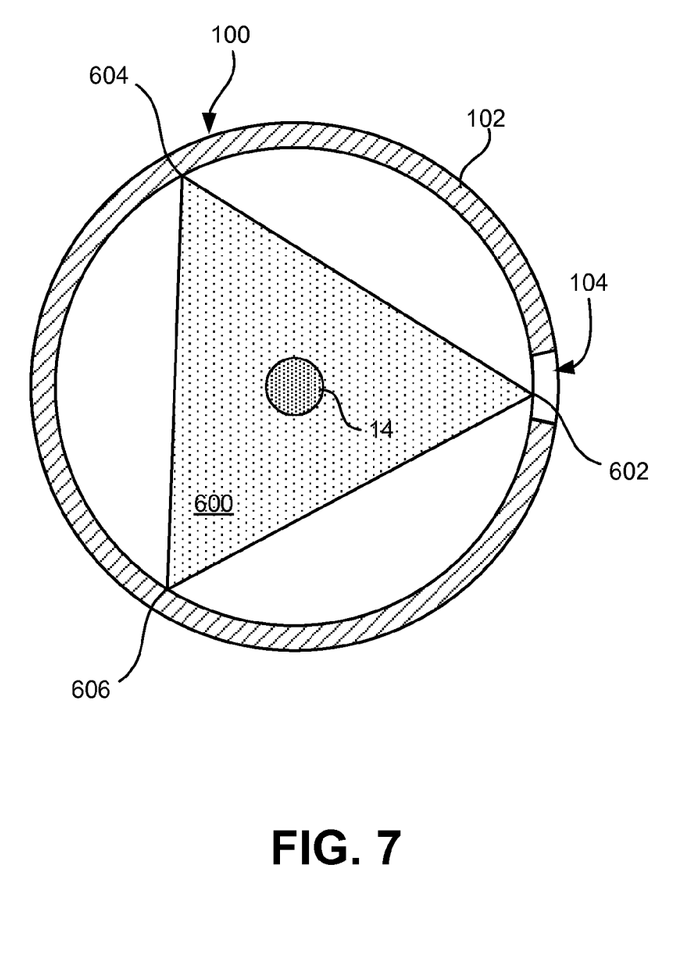
FIG. 7 is a schematic, cross-sectional end view of the cut sleeve of FIG. 1 with a non-cylindrical optical fiber ferrule inserted according to another implementation described herein.

FIG. 7 is a schematic, cross-sectional end view of eccentric cut sleeve 100 with fiber ferrule 600 inserted according to another implementation described herein. Similar to the configuration shown in FIG. 5, fiber ferrule 600 may be inserted partly into eccentric cut sleeve 100 so as to mate with a similarly-sized fiber ferrule 600 (not shown) inserted into an opposite end of eccentric cut sleeve 100. As shown in FIG. 7, fiber ferrule 600 provides three edges 602, 604, and 606 in contact with the inside of cylinder 102. The simplified configuration of the triangular cross-section of fiber ferrule 600 may provide for more precise centering of optical fiber 14 within eccentric cut sleeve 100 (e.g., in contrast with round cross-sections, for example). In the configuration of FIGS. 6 and 7, fiber ferrule 600 includes three contact lines defined by the three edges 602, 604, and 606 along the length of fiber ferrule 600. While edge 602, particularly, is shown as adjacent to split 104 in the cross-section of FIG. 7, edge 602 is constrained from entering split 104. The curve of split 104 around cylinder 102 keeps straight edge 602 in contact with cylinder 102 along most of the length of edge 602. As described in more detail below, generally, fiber ferrule 600 can have a cross-section with contact points defined by multiple edges along a length of fiber ferrule 600. However, manufacturing imperfections in fiber ferrules 600 may still prevent optimal alignment of optical fiber cores optical fiber 14. The configuration of fiber ferrule 600 with defined edges, along with use of eccentric cut sleeve 100, may allow for simplified, precise adjustments to center optical fiber 14 after fiber 14 is secured within ferrule 600.

For example, after optical fiber 14 is secured within fiber ferrule 600, the bonding agent is cured, and the end of fiber ferrule 600/optical fiber 14 is polished, the apex offset and/or centering (e.g., of optical fiber 14 within fiber ferrule 600) can be tested. For example, interferometric equipment may be used to reflect light off the end of a connector 10 (e.g., particularly fiber ferrules 12 or 600). The reflected light is combined with light reflecting off a reference surface to form constructive and destructive interference waves. A resulting interference pattern can be visualized as a contour map of the end of the fiber ferrule. An apex offset value—identifying a distance between the center the optical fiber and the vertex of the polished ferrule—and/or an end face center may be determined from the contour map (e.g., using a computer plot). Other types of geometrical measurements may also be used to determine concentricity of optical fiber 14 within fiber ferrule 600.

The apex offset, centering, and/or other geometrical measurement may identify a distance, such that one or more edges 602, 604, or 606 of fiber ferrule 600 can be physically adjusted to provide more accurate centering of optical fiber 14 within fiber ferrule 600. For example, a desired tolerance for alignment of the center the optical fiber and the vertex of the polished ferrule may be given as 10 microns, so that any misalignment of the center of the optical fiber and the vertex of the polished ferrule by more than 10 microns would require physical adjustment of fiber ferrule 600.

Figure 8:
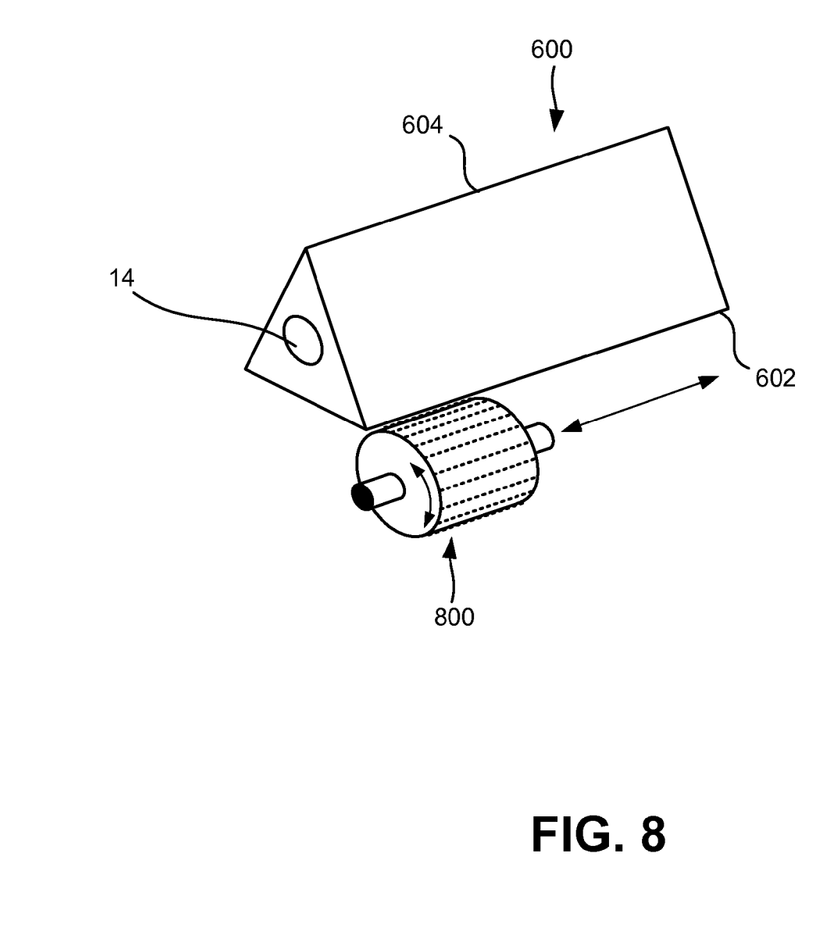
FIG. 8 is a schematic view of a grinding operation that may be performed to align non-cylindrical optical fiber ferrules within a cut sleeve according to another implementation described herein.

For example, FIG. 8 shows that a grinding disk 800 may be applied to an edge (e.g., edge 602) of fiber ferrule 600 to physically adjust the center of fiber ferrule 600. In one implementation, grinding disk 800 and fiber ferrule 600 may be secured within a jig (not shown) to allow precision grinding of fiber ferrule 600 (e.g., within microns). According to one implementation, ferrule 600 may be fabricated to form a slightly larger minimum bounding circle than a final desired diameter to allow for precision grinding after centering measurements are taken. In an implementation, insertion losses using eccentric cut sleeve 100 with a physically adjusted fiber ferrule 600 may be improved from typically-expected values of about 0.3 dB (e.g., using a typical ferrule and conventional cut sleeve with a straight axial cut) to less than 0.1 dB, less than 0.05 dB, or even less.

Figure 9:
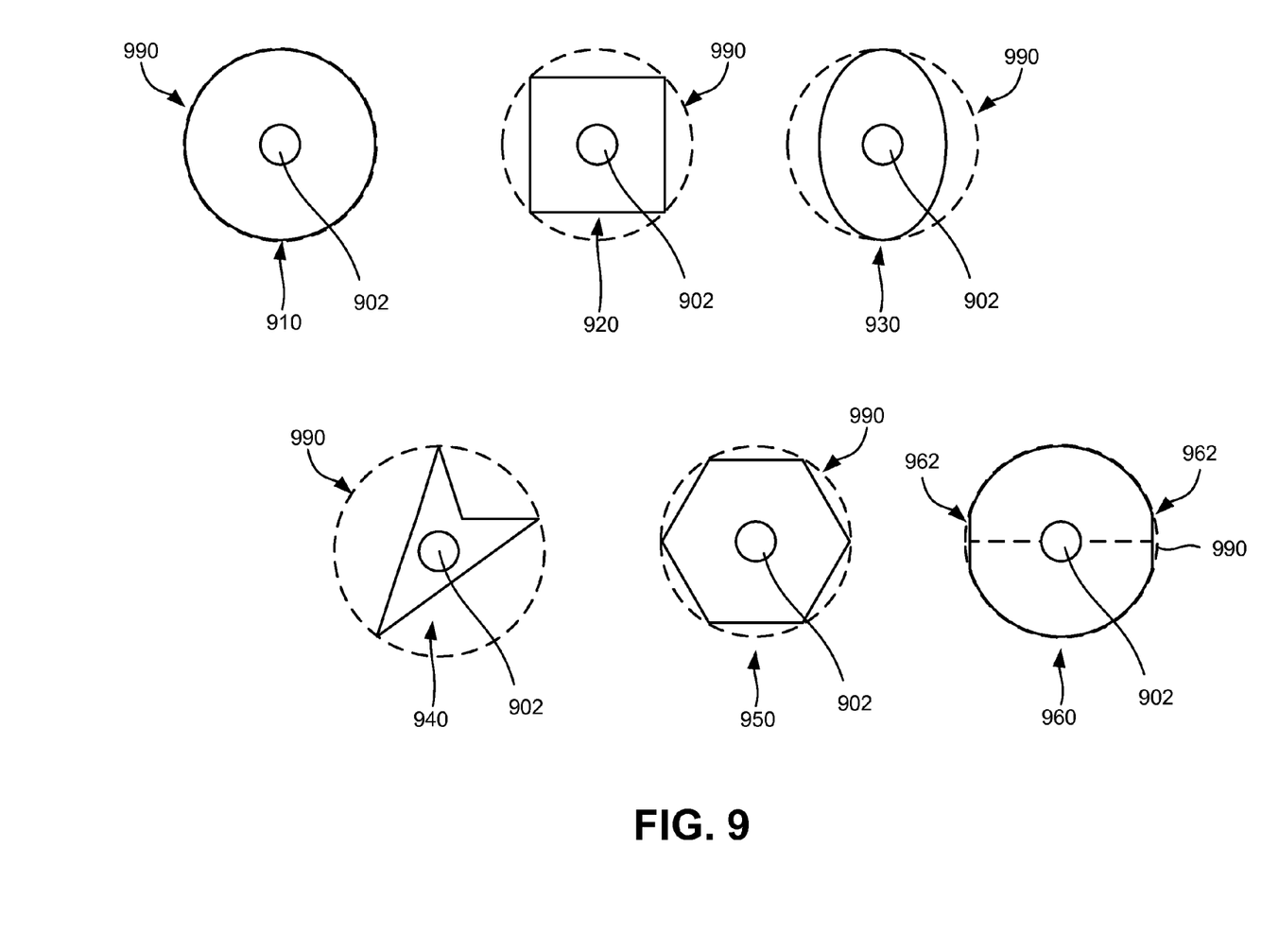
FIG. 9 provides simplified end views of exemplary optical fiber ferrule shapes that may be used with the cut sleeve of FIG. 1.

FIG. 9 provides simplified end views of other exemplary shapes that may be used for optical fiber ferrule 600 and inserted within eccentric cut sleeve 100. Exemplary shapes include, circular cross-section 910, square cross-section 920, oval cross-section 930, arrow cross-section 940, pentagon cross section 950, and near circular cross-section 960. Each cross-sectional shape may be formed for optical fiber ferrule 600, for example, using molding processes and drilling a hole 902 for optical fiber 14. The cross sections may be symmetrical or non-symmetrical shapes. For each cross-sectional shape of optical fiber ferrule 600, hole 902 can be formed so as to be positioned at the center of a minimum bounding circle 990 formed by the edges of the cross section (which corresponds to a concentric center of eccentric cut sleeve 100 when optical fiber ferrule 600 is inserted in eccentric cut sleeve 100). Minimum bounding circle 990 may be a smallest circle that completely contains the cross-sectional shape of optical fiber ferrule 600. Minimum bounding circle 990 may correspond to, for example, a standard ferrule outside diameter of 1.25 mm or 2.5 mm.

In implementations shown in FIG. 9, cross-sections 910-960 are shown centered within minimum bounding circle 990. In some implementations, pre-formed cross-sections with slightly larger minimum bounding circles may be fabricated and optical fibers 14 inserted before fiber ferrule 600 is ground to a desired cross-sectional size to center optical fiber 14 within minimum bounding circle 990.

In another implementation, such as shown in near-circular cross-section 960, optical fiber ferrule 600 may be formed using a two molded pieces. Two-piece ferrules, such as the one shown in near-circular cross section 960, may allow manufacture without the additional step of drilling hole 902, but may typically include an imperfect shape. For example, instead of a perfectly circular cross-section, near-circular cross-section 960 may include one or more flat edges 962. When optical fiber ferrule 600 with near-circular cross-section 960 is inserted into eccentric cut sleeve 100, split 104 will not align with any significant portion of edges 962. Thus, eccentric cut sleeve 100 can uniformly apply concentric forces to optical fiber ferrule 600 along the axial length of eccentric cut sleeve 100.

Although FIG. 9 includes exemplary shapes that may be used for optical fiber ferrule 600, other shapes may also be used. For example, additional polygonal cross-sections, asymmetrical cross-sections, or symmetrical cross-sections may be used to form a minimum bounding circle that corresponds to a standard ferrule diameter.

Cut ferrule sleeve 100 may be used to align optical fibers 14 of fiber ferules with similar or dissimilar cross-sectional shapes. According to implementations described herein, cut ferrule sleeve 100 may generally accommodate any two optical fiber ferrules 600 with different cross-sectional shapes so long as the minimum bounding circles 990 for each of the optical fiber ferrules 600 are the same (e.g., within an accepted tolerance).

Figure 10:
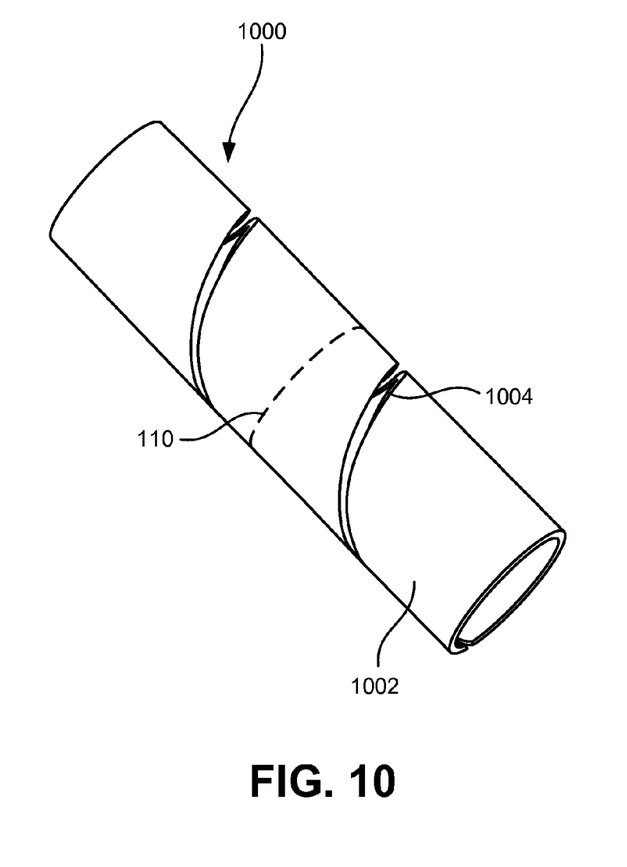
FIG. 10 is a simplified, isometric view of a cut sleeve according to another implementation described herein.

FIG. 10 is a simplified isometric view of an eccentric cut sleeve 1000 according to another implementation described herein. Eccentric cut sleeve 1000 may include a cylinder 1002 with a split 1004 along an axial length (e.g., from one opening to the opposite opening) of cylinder 1002. Split 1004 may be distributed around all or at least a substantial portion of the circumference of cylinder 1002. Eccentric cut sleeve 1000 may include similar materials and/or use similar manufacturing processes as described above in connection with eccentric cut sleeve 100. In contrast with eccentric cut sleeve 100, however, split 1004 of eccentric cut sleeve 1000 may not be symmetrical with respect to centerline 110. Split 1004 may, however, extend along the complete circumference of cylinder 1002 on either side of centerline 110.

Figure 11:
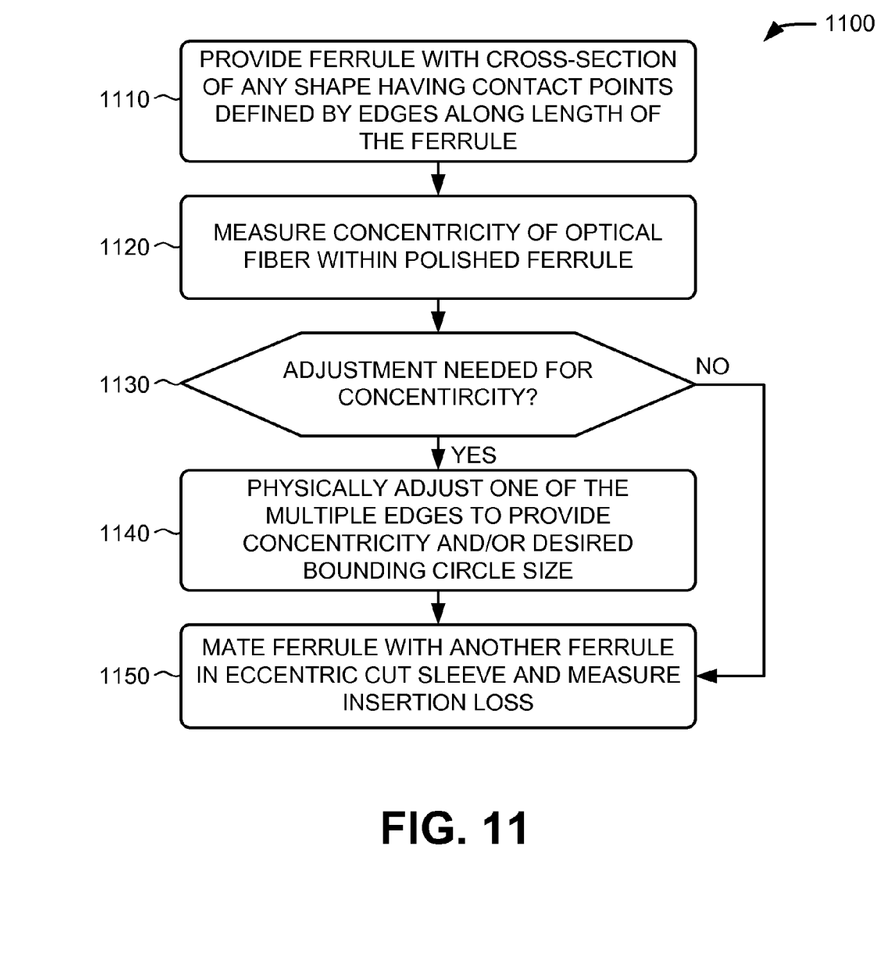
FIG. 11 is a flow chart of an exemplary process for aligning optical fibers within an eccentric cut sleeve, according to an implementation described herein.

FIG. 11 is a flow chart of a process 1100 for aligning optical fibers within an eccentric cut sleeve, according to an implementation described herein. Process 1100 may include obtaining a fiber ferrule with a cross-section of any shape having contact points defined by one or more edges along a length of the fiber ferrule (block 1110). For example, as described above in connection with FIGS. 6, 7, and 9, fiber ferrule 600 may include a non-circular cross-sectional shape with a cross-section that dictates a minimum bounding circle 990 (or can eventually be ground to fit within minimum bounding circle 990). In one implementation, fiber ferrule 600 may include a cross-section of an equilateral triangle. In other implementations, fiber ferrule 600 may include one of the cross-sectional shapes indicated in FIG. 9, or another non-circular cross-section.

Process 1100 may further include measuring concentricity of an optical fiber within the polished fiber ferrule (block 1120) and determining if the measured concentricity is outside a desired tolerance (block 1130). For example, after optical fiber 14 is secured within fiber ferrule 600, the bonding agent is cured, and the end of fiber ferrule 600/optical fiber 14 is polished, the apex offset and/or centering (e.g., of optical fiber 14 within fiber ferrule 600) can be measured to determine whether optical fiber 14 is centered within fiber ferrule 600 (e.g., within a particular tolerance). For example, if the center the optical fiber and the vertex of the polished ferrule are misaligned by a particular distance, the concentricity may be deemed out of tolerance.

If the measured concentricity is outside a desired tolerance (block 1130—YES), process 1100 may include physically adjusting one or more of the multiple edges (block 1140). For example, as described in connection with FIG. 8, a grinding disk 800 may be applied to edge 602 of fiber ferrule 600 to physically adjust the centering of optical fiber 14 within fiber ferrule 600. In one implementation, ferrule 600 may have a slightly larger minimum bounding circle than a final desired diameter to allow for precision grinding to a desired size after centering measurements for optical fiber 14 are taken. Thus, precision grinding of multiple edges (edges 602, 604, and/or 606) may be required to center optical fiber 14 within ferrule 600 and adjust ferrule 600 to a desired size of minimum bounding circle 990.

If the measured concentricity is not outside a desired tolerance (block 1130—NO) or after physically adjusting one of the multiple edges, process 1100 may include mating the fiber ferrule with another fiber ferrule in an eccentric cut sleeve and measuring the insertion loss (block 1150). For example, as describe above in connection with FIGS. 5 and 7, one ferrule 600 may be mated to another ferrule 600 within eccentric cut sleeve 100 to provide an optical connection between two optical fibers 14. Eccentric cut sleeve 100 (along with other components of connector 10 and adapter 20) may provide and maintain proper geometry of the connection to provide optimal signal transfer at an interface between optical fibers 14. Signals may be passed through the interface of the two optical fibers 14 to verify that ferrule 600 (e.g., with optical fiber 14 centered according to implementations described herein) can provide insertion losses, within cut sleeve 100, below required levels. In one implementation, insertion losses may be required to a tolerance of less than 0.1 dB, less than 0.05 dB, or even lower.

As described above, devices and methods may include a cut sleeve including a cylinder with a split or discontinuity along an axial length of cylinder and distributed symmetrically around at least half of a circumference of the cylinder on either side of the center of the cylinder. The cylinder may be sized to receive a first fiber ferrule and a second fiber ferrule of substantially equal diameters.

Cut sleeves and fiber ferrules described herein may be included within existing standard fiber optic connector components. In contrast with split sleeves using a straight-line cut that provide a one-sided hinge-type force one inserted fiber ferrules, the eccentric cut sleeves described herein provide a radially distributed force to more effectively align inserted fiber ferrules. Edges of fiber ferrules with non-circular cross-sections may become lodged in the split of split sleeves that use a straight-line cut, potentially resulting in poor optical fiber alignment. The eccentric cut sleeves described herein can align fiber ferrules with non-circular cross-sections and may encourage use of new fiber ferrule shapes that can be made with simpler and/or less expensive manufacturing processes. Furthermore, using ferrules with centered optical fibers according to implementations described herein, imperfections in eccentric cut sleeves (e.g., imperfections/inconsistencies in cylinder diameter) may still provide an alignment improvement over use of ferrules in conventional straight-cut sleeves.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 11, the order of the blocks may be modified in other implementations. Further, non-dependent blocks may be performed in parallel.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A cut sleeve for a fiber optic connector adapter, comprising:
   a cylinder including a discontinuity along an axial length of the cylinder,
   wherein the discontinuity is distributed around at least half of a circumference of the cylinder,
   wherein the cylinder is sized to receive a first fiber ferrule and a second fiber ferrule with cross-sections having a same size minimum bounding circle,
   wherein the cut sleeve is included within an adapter that is configured to receive a connector including the first fiber ferrule, and
   wherein the adapter is configured to permit rotation of the cut sleeve within the adapter.

2. The cut sleeve of claim 1, wherein the cylinder is formed from a single rolled sheet.

3. The cut sleeve of claim 2, wherein the single rolled sheet includes a metal or metal alloy.

4. The cut sleeve of claim 1, wherein the cylinder is formed from a ceramic material.

5. The cut sleeve of claim 1, wherein the discontinuity is formed by a laser cutting process on the cylinder.

6. The cut sleeve of claim 1, wherein the cylinder is sized to receive the first fiber ferrule and the second fiber ferrule each with the minimum bounding circle having a 1.25 mm outside diameter or a 2.5 mm outside diameter.

7. The cut sleeve of claim 1, wherein the discontinuity is distributed symmetrically around the circumference of the cylinder with respect to a center circumference line of the cylinder.

8. The cut sleeve of claim 1, wherein the cross-sections of the first fiber ferrule and the second fiber ferrule are non-circular.

9. The cut sleeve of claim 8, wherein the first fiber ferrule and the second fiber ferrule each contact the cylinder along three edges.

10. The cut sleeve of claim 1, wherein the cylinder is sized to receive the first fiber ferrule with diameter of the minimum bounding circle being 1.25 millimeters.

11. The cut sleeve of claim 1, wherein the cross-section of the first fiber ferrule is of a different shape than the cross-section of the second fiber ferrule.

12. The cut sleeve of claim 1, wherein the cut sleeve uniformly applies concentric forces to the first fiber ferrule and the second fiber ferrule, along the axial length of the cylinder, when the first fiber ferrule and the second fiber ferrule are inserted into the cylinder.

13. An adaptor for a fiber optic connecting system, comprising:
a cut sleeve having a cylinder with a discontinuity along an axial length of the cylinder,
wherein the discontinuity is distributed around at least half of a circumference of the cylinder,
wherein the cylinder is sized to receive a first fiber ferrule and a second fiber ferrule with cross-sections having a same size minimum bounding circle,
wherein the adapter is configured to receive a connector including the first fiber ferrule, and
wherein the adapter is configured to permit rotation of the cut sleeve within the adapter.

14. The adaptor of claim 13, wherein the first cross-sectional shape is different than the second cross-sectional shape.

15. The adaptor of claim 13, wherein the first cross-sectional shape is non-circular.

16. The adaptor of claim 15, wherein the first fiber ferrule contacts an interior of the cylinder along at least three points of the first cross-sectional shape.

17. The adaptor of claim 13, wherein the first fiber ferrule includes a first optical fiber,
wherein the second fiber ferrule includes a second optical fiber, and
wherein the cut sleeve concentrically aligns the first optical fiber with the second optical fiber.

18. The adaptor of claim 17, wherein an insertion loss at an interface of the first optical fiber and the second optical fiber within the cylinder is 0.1 dB or less.

19. A method, comprising:
obtaining a first fiber ferrule with a first cross-section having contact points defined by multiple edges along a length of the first fiber ferrule;
measuring a first concentricity of a first optical fiber within the first fiber ferrule;
physically adjusting one of the multiple edges when the first concentricity is outside a desired tolerance;
inserting the first fiber ferrule into a cut sleeve that includes a cylinder with a discontinuity along an axial length of the cylinder,
wherein the discontinuity is distributed around at least half of a circumference of the cylinder,
wherein the cylinder is sized to receive the first fiber ferrule and a second fiber ferrule each with cross-sections having a same size minimum bounding circle,
wherein the cut sleeve is included within an adapter that is configured to receive a connector including the first fiber ferrule, and
wherein the adapter is configured to permit rotation of the cut sleeve within the adapter.

20. The method of claim 19, further comprising:
obtaining the second fiber ferrule with a second cross-section having contact points defined by multiple edges along a length of the second fiber ferrule;
measuring a second concentricity of a second optical fiber within the second fiber ferrule;
physically adjusting one of the multiple edges of the second fiber ferrule when the second concentricity is outside the desired tolerance; and
inserting the second fiber ferrule into the cut sleeve, wherein an insertion loss at an interface of the first optical fiber and the second optical fiber within the cut sleeve is 0.1 dB or less.

* * * * *